United States Patent
Chuang

(10) Patent No.: US 11,222,408 B1
(45) Date of Patent: Jan. 11, 2022

(54) METHOD TO SMOOTH EDGE OF IMAGE

(71) Applicant: HIMAX TECHNOLOGIES LIMITED, Tainan (TW)

(72) Inventor: Chi-Feng Chuang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/035,640

(22) Filed: Sep. 28, 2020

(51) Int. Cl.
| | |
|---|---|
| *G06T 5/00* | (2006.01) |
| *G06T 5/20* | (2006.01) |
| *G09G 5/02* | (2006.01) |
| *H04N 1/60* | (2006.01) |
| *H04N 5/57* | (2006.01) |
| *H04N 9/64* | (2006.01) |
| *H04N 9/77* | (2006.01) |

(52) U.S. Cl.
CPC ............. *G06T 5/002* (2013.01); *G06T 5/20* (2013.01); *G09G 5/02* (2013.01); *G06T 2207/10024* (2013.01); *G06T 2207/20192* (2013.01); *G09G 2320/0242* (2013.01); *G09G 2320/0626* (2013.01)

(58) Field of Classification Search
CPC combination set(s) only.
See application file for complete search history.

(56) References Cited

U.S. PATENT DOCUMENTS

| | | | |
|---|---|---|---|
| 2009/0220151 A1* | 9/2009 | Lin | H04N 1/62 382/167 |
| 2016/0125579 A1* | 5/2016 | Song | H04N 19/117 382/261 |
| 2017/0053582 A1* | 2/2017 | Hsu | G09G 3/2051 |
| 2018/0166003 A1* | 6/2018 | Wang | G06T 5/003 |
| 2019/0347777 A1* | 11/2019 | Meng | G09G 3/20 |
| 2020/0167894 A1* | 5/2020 | Zhu | G06T 3/4053 |

* cited by examiner

*Primary Examiner* — Wesner Sajous
(74) *Attorney, Agent, or Firm* — Winston Hsu

(57) ABSTRACT

A method to smooth periphery pixels of an image includes operations. First, an image includes periphery pixels is provided. Each periphery pixel includes periphery sub-pixels. Each periphery sub-pixel includes a location parameter, a brightness parameter and a color parameter. Second, the image which includes the periphery pixels is displayed. Next, the periphery pixels are locked by targeting each periphery sub-pixel of each periphery pixel. The brightness parameter of each periphery sub-pixels is collected to target the periphery sub-pixels. Then, a smoothing operation is carried out to adjust the brightness parameters of the periphery sub-pixels to obtain adjusted brightness parameters. Afterwards, the periphery pixels with the adjusted brightness parameters are unlocked to obtain the image which has at least one smooth edge.

17 Claims, 8 Drawing Sheets
(7 of 8 Drawing Sheet(s) Filed in Color)

METHOD TO SMOOTH EDGE OF IMAGE

BACKGROUND OF THE INVENTION

1. Field of the Invention

The present invention generally relates to a method to modify an edge or a curve of a color image. In particular, the present invention generally relates to a method to smooth an edge of a color image or to adjust a color shift of a color image without adjusting the color components of a related pixel in the color image.

2. Description of the Prior Art

Technically speaking, a color image is a collection of multiple pixels in an array of an electronic display device. Each pixel may include multiple sub-pixels, for example a red sub-pixels (R), a green sub-pixels (G) and a blue sub-pixels (B). Most color images may include one or more edges or curves.

FIG. 1 illustrates an example of a schematic diagram of a partial top view of a typical color image with multiple pixels. FIG. 1 illustrates that a portion of the color image 10 includes multiples pixels in the form of an array 30. The color image 10 has a left edge 11 and a right curve 12.

Two adjacent pixels may have a similar sub-pixel layout or different sub-pixel layouts. For example, the pixel 21 and the pixel 22 have a similar sub-pixel layout with the B sub-pixel disposed on the left side of the pixel. On the contrary, the pixel 21 has the B sub-pixel disposed on the left side of the pixel but the pixel 23 has the B sub-pixel disposed on the right side of the pixel so the pixel 21 and the pixel 23 have different sub-pixel layouts.

When the color image 10 is shown in a display device 40, an edge or a curve in different orientations may have different visual flaws, such as a blurry side, a jaggy side or a color-shift compared with an ideal image. FIG. 2A illustrates an example of a partial top view of an edge 13 shown in a display device 40 in accordance with the typical color image of FIG. 1. FIG. 2B illustrates an example of a partial top view of a curve 14 shown in a display device 40 in accordance with the typical color image of FIG. 1. Because of the different sub-pixel layouts, the edge 13 and the curve 14 respectively show different visual flaws. For example, on one hand the edge 13 visually has a blurry, jaggy side with a greenish color-shift. On the other hand, the curve 14 visually has a blurry, jaggy side with a reddish color-shift. When it comes to a complicated image with multiple curves and/or edges to form a notch, a corner or a hole, the visual flaws as a whole seriously jeopardize the display quality of the image because of the configuration of the sub-pixels. Accordingly, a solution is needed to solve the problem of visual flaws of a display device.

SUMMARY OF THE INVENTION

In the light of the above, the present invention proposes a novel method to enhance the visual resolution of a color images with curves and/or edges to correct the visual flaws in a display device by considering the arrangements of the periphery pixels or of periphery sub-pixels. In particular, the method of the present invention may correct the color-shift problem of a color image on a gray scale domain in the absence of the modification of the color components of the color image.

Accordingly, the present invention proposes a novel method to modify a curve or an edge, for example to smooth periphery pixels of an image. The method may include the following operations. First, an image includes a plurality of periphery pixels is provided. Each one of the periphery pixels may include a plurality of periphery sub-pixels. Each one of the periphery sub-pixels may include a display datum. The display datum may include a location parameter, a brightness parameter and a color parameter. Second, the image which includes the periphery pixels and has at least one rough edge is displayed. Next, the periphery pixels are locked by targeting each one of the periphery sub-pixels of each one of the periphery pixels. The brightness parameters of the periphery sub-pixels are respectively collected to target the periphery sub-pixels. Then, a smoothing operation is carried out to adjust the brightness parameters of the periphery sub-pixels which are subjected to targeting to smooth the at least one rough edge to obtain adjusted brightness parameters. The adjusted brightness parameters correspond to the brightness parameters. Afterwards, the periphery pixels with the adjusted brightness parameters are unlocked to obtain the image which has at least one smooth edge. The at least one smooth edge corresponds to the at least one rough edge.

In one embodiment of the present invention, the image may include a curve. The curve corresponds to the at least one rough edge and may include at least one of a notch edge, a corner edge and a hole edge.

In another embodiment of the present invention, the color parameter may include a red color parameter, a green color parameter and a blue color parameter.

In another embodiment of the present invention, a computer with a display may be used for displaying the image with at least one rough edge.

In another embodiment of the present invention, the at least one rough edge may include at least one of a blurry edge, a jaggy edge and a color-shift edge.

In another embodiment of the present invention, to smooth the at least one rough edge may include modifying the color-shift edge to obtain a color-soft edge without adjusting the color parameter.

In another embodiment of the present invention, the location parameter may correspond to displaying the image with the at least one rough edge in a display device.

In another embodiment of the present invention, locking the periphery pixels may be carried out on a spatial domain by locking the color parameter.

In another embodiment of the present invention, performing the smoothing operation may be carried out on the spatial domain.

In another embodiment of the present invention, a low pass filter may be used for performing the smoothing operation.

In another embodiment of the present invention, the low pass filter may be an edge-preserving smooth filter.

In another embodiment of the present invention, the smoothing operation may be carried out to exclusively adjust the brightness parameters without adjusting the color parameter.

In another embodiment of the present invention, displaying the image with the at least one rough edge including the periphery pixel may be arranged in accordance with the location parameter.

In another embodiment of the present invention, the location parameter may correspond to a layout of the image.

In another embodiment of the present invention, unlocking the periphery pixels may be carried out by inversing to the display data which include the adjusted brightness parameters.

In another embodiment of the present invention, the image may correspond to a delta RGB panel.

In another embodiment of the present invention, a level of the brightness parameter may be respectively adjusted to collectively adjust the brightness parameters.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing (s) will be provided by the Office upon request and payment of the necessary fee.

DETAILED DESCRIPTION

Figure 1:
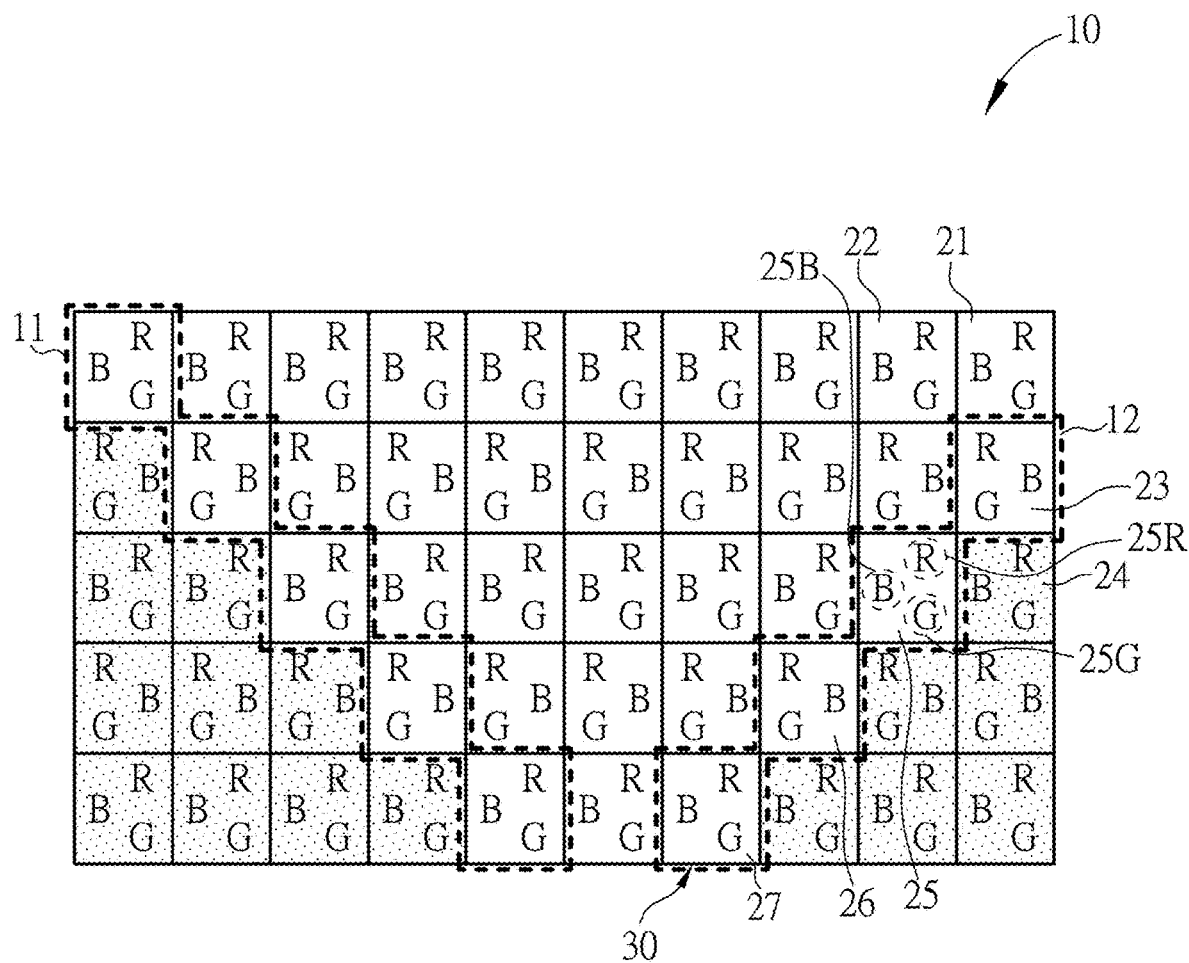
FIG. 1 illustrates an example of a schematic diagram of a partial top view of a typical color image.
Figure 2A:
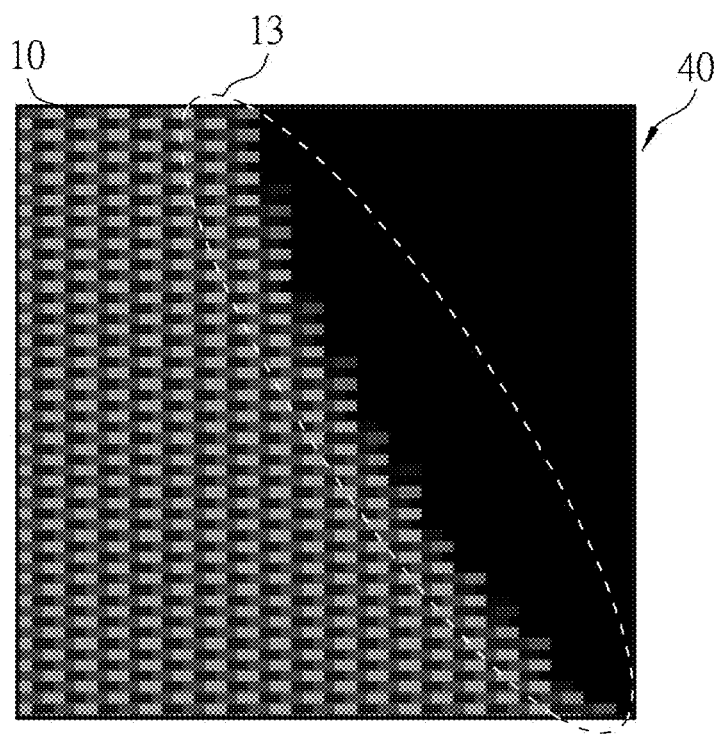
FIG. 2A illustrates an example of a partial top view of the edge shown in a display device in prior art in accordance with the typical color image of FIG. 1.
Figure 2B:
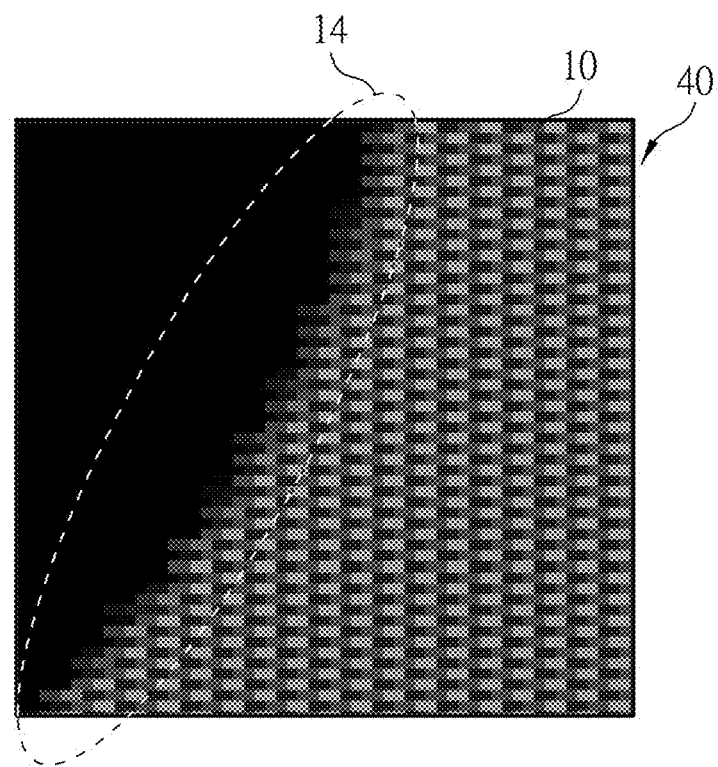
FIG. 2B illustrates an example of a partial top view of the curve shown in a display device in prior art in accordance with the typical color image of FIG. 1.

The present invention may provide a novel method to modify a curve or an edge of an image, for example to smooth periphery pixels of an image. After subjected to the simple method of the present invention, an original image with a blurry curve or a jaggy edge may be smoothed to have a new notch, a new corner or a new hole with better visual quality. The versatile method of the present invention may be applied to any graphics, and to any sub-pixel arrangement.

A color image may include one or more curves or one or more edges on the graphic border, such as a notch edge, a notch curve, a corner edge, a corner curve, a hole curve or a hole edge, but the present invention is not limited thereto. A color image is a collection of pixels in a display device. The configuration of the sub-pixels in the pixels may visually form a blurry curve or a jaggy edge, or further form a color shift. The method of the present invention may provide the following operations to diminish or further eliminate the visual flaws of a rough curve or a rough edge. FIG. 3 to FIG. 6 illustrate a first embodiment of the method of the present invention to smooth periphery pixels of a corner curve. FIG. 7 to FIG. 10 illustrate a second embodiment of the method of the present invention to smooth periphery pixels of a notch edge. FIG. 11 to FIG. 14 illustrate a third embodiment of the method of the present invention to smooth periphery pixels of a hole curve.

First, an image includes a plurality of periphery pixels is provided. Please refer to FIG. 1 for the illustrations of a typical image and periphery pixels. For example, the pixel 21 and the pixel 22 are not periphery pixels because all the neighboring pixels of the two pixels are of the same status (white status). The pixel 23 is a periphery pixel because one of its neighboring pixels, that is the pixel 24, has different status (gray status). The pixel 23 is considered as a periphery pixel because it is located at the periphery region (next to the pixel 24) of the image 10. Similarly, the pixel 25, the pixel 26 and the pixel 27 are periphery pixels. The pixel 23, the pixel 25, the pixel 26 and the pixel 27 which are adjacent to one another may form a side, such as a curve or an edge of the image 10. In the following descriptions, the pixel 25 is taken as an example of a periphery pixel for the operations of the method of the present invention, but the present invention is not limited thereto.

A periphery pixel may include a plurality of periphery sub-pixels, and each periphery sub-pixel may include a display datum. The display datum may include the information of a specific periphery sub-pixel, such as a location parameter, a brightness parameter and a color parameter. The location parameter of a specific sub-periphery pixel may refer to the location of the specific periphery pixel in the image, like the address of a house.

The brightness parameter of a specific periphery sub-pixel may refer to the brightness value of the specific periphery sub-pixel, and the brightness parameter may correlate to the gray scale of the sub-pixel, such as black-gray-while scale. Accordingly, the brightness parameter may refer to as a black-white parameter and is irrelevant to the color nature of the pixel.

The color parameter of a specific periphery pixel may refer to the color saturation of the specific periphery pixel, and the color parameter may be relevant to the RGB color model of the pixel, such as a red-green-blue strength. A color parameter may include a red color parameter, a green color parameter and a blue color parameter, but the present invention is not limited thereto. Accordingly, the color parameter may be referred to as an RGB parameter if a pixel consists of RGB sub-pixels. FIG. 1 illustrates that the pixel 25 may include an R sub-pixel 25R, a G sub-pixel 25G and a B sub-pixel 25B, but the present invention is not limited thereto. Each one of the periphery sub-pixels may include a display datum. The display datum may include a location parameter, a brightness parameter and a color parameter.

For example, each one of the R sub-pixel 25R, the G sub-pixel 25G and the B sub-pixel 25B may include a location parameter, a brightness parameter and a color parameter. Taking the sub-pixel 25R as an example, the sub-pixel 25R may include a location parameter 25RP, a brightness parameter 25RW and a color parameter 25RC. Accordingly, the sub-pixel 25G may include a location parameter 25GP, a brightness parameter 25GW and a color parameter 25GC, and the sub-pixel 25B may include a location parameter 25BP, a brightness parameter 25BW and a color parameter 25BC. The data of the periphery pixels of an image may be stored electronically, for example in an electronic medium.

Figure 3:
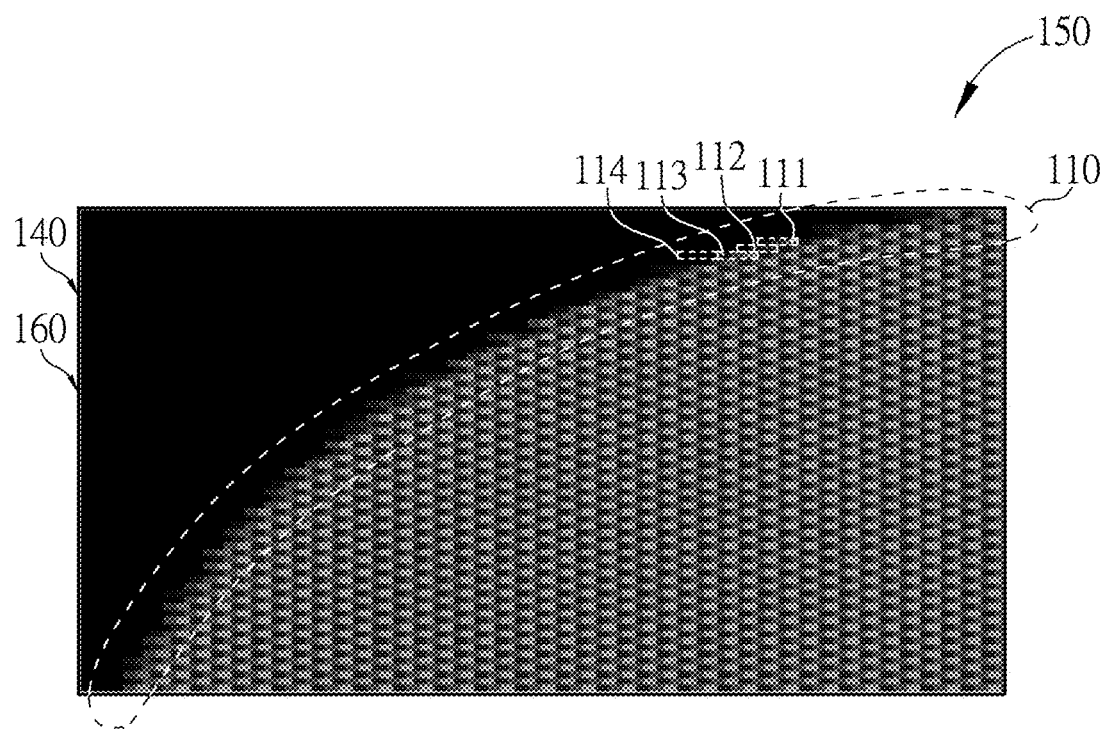
FIG. 3 illustrates that the pixels form a corner curve of an image in accordance with the method of the present invention.
Figure 7:
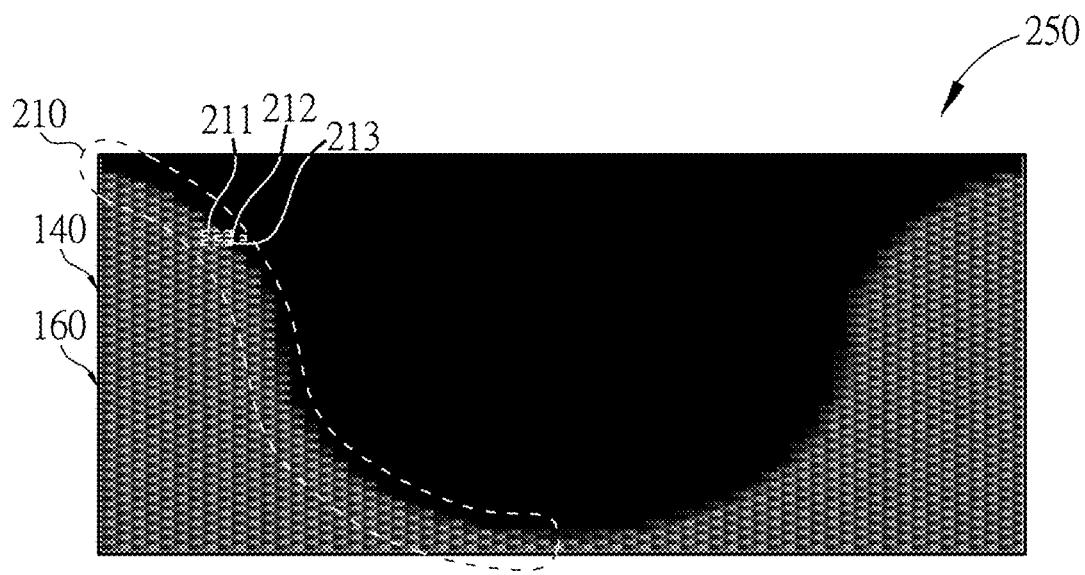
FIG. 7 illustrates that the pixels form a notch edge of an image in accordance with the method of the present invention.
Figure 11:
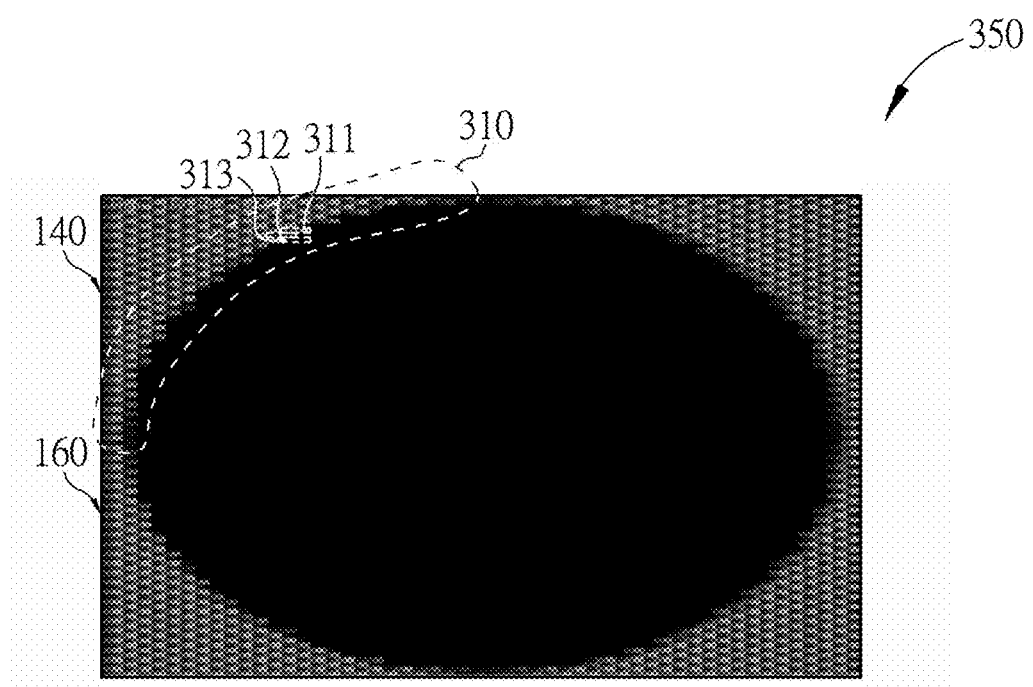
FIG. 11 illustrates that the pixels form a hole curve of an image in accordance with the method of the present invention.

Second, the image which includes the periphery pixels is converted to arrangement space, for example displayed on a display device. The location parameter may correspond to the layouts of the sub-pixels of the color image. FIG. 3 illustrates a corner curve of an image is displayed on a display device 140. FIG. 7 illustrates a notch edge of an image is displayed on a display device 140. FIG. 11 illustrates a hole curve of an image is displayed on a display device 140. The combination of adjacent periphery pixels, such as the pixel 23, the pixel 25, the pixel 26 and the pixel 27 in FIG. 1 may form a curve or an edge of the image 10, but the present invention is not limited thereto. The location parameters of a pixel, for example the location parameter 25RP, the location parameter 25GP and the location parameter 25BP of the pixel 25, may facilitate the formation of the image in a display device. In some embodiments, displaying the image with one or more rough edges including the periphery pixels may be carried out by arranging all the sub-pixels in accordance with the location parameters. In other words, the location parameters may correspond to displaying the image with one or more rough edges in a display device.

Figure 5:
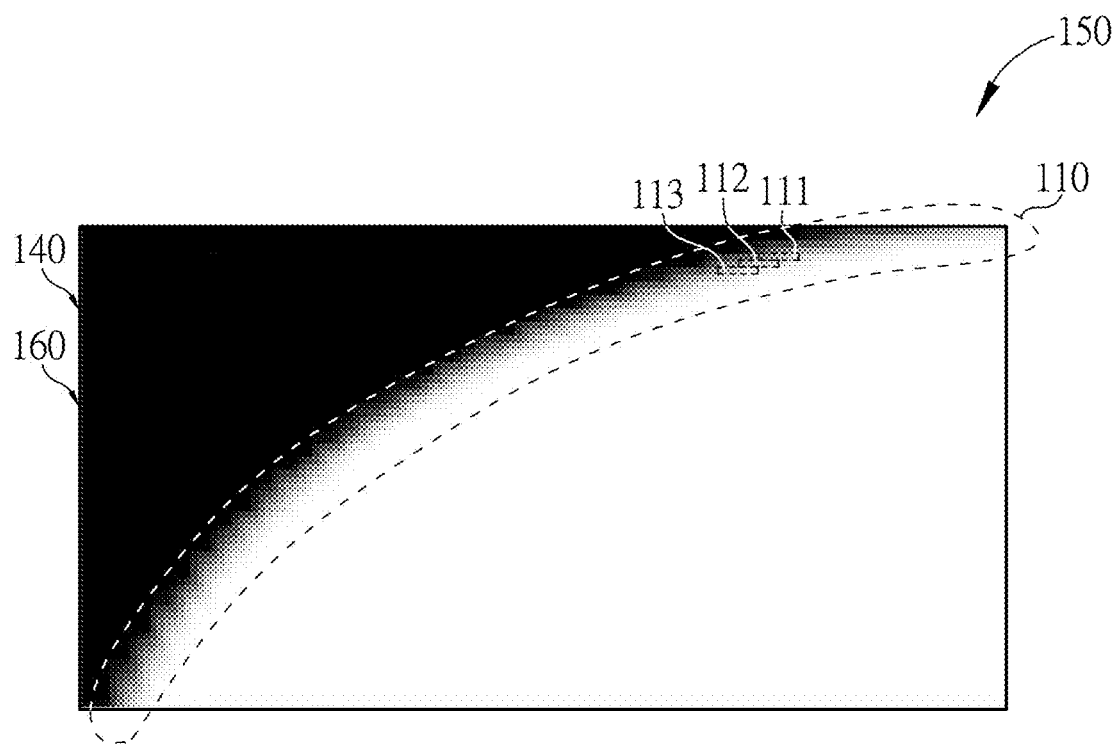
FIG. 5 illustrates the image with a smoother corner curve which corresponds to FIG. 4 on a spatial domain in accordance with the method of the present invention.

Because of different layouts of the sub-pixels in the adjacent periphery pixels, a curve or an edge of the image may show visual flaws. A visual flaw may refer to a blurry curve, a jaggy edge or a color shift, namely a rough edge or a rough curve. For example, FIG. 3 illustrates that at least the pixel 111, the pixel 112 and the pixel 113 form a corner curve 110 of an image 150, but the present invention is not limited thereto. FIG. 5 illustrates that at least the pixel 211, the pixel 212 and the pixel 213 form a notch edge 210 of an image 250, but the present invention is not limited thereto. FIG. 7 illustrates that at least the pixel 311, the pixel 312 and the pixel 313 form a hole curve 310 of an image 350, but the present invention is not limited thereto.

The corner curve 110, the notch edge 210 and/or the hole curve 310 may correspond to one or more rough edges or one or more rough curves. In one embodiment of the present invention, a rough edge or a rough curve may include at least one of a blurry edge, a jaggy edge and a color-shift edge. For example, the corner curve 110 visually looks like a rough edge because the corner curve 110 shows a blurry curve with a jaggy edge and a reddish color shift. It is observed that the notch edge 210 visually looks like a rough edge because the notch edge 210 shows a jaggy edge with a blurry curve and a greenish color shift. Similarly, the hole curve 310 visually looks like a rough edge because the hole curve 310 shows a blurry curve with a jaggy edge and a greenish color shift.

A computer with a display device 140, such as a tablet computer 160 as shown in FIG. 3, may be used for displaying the image 150 with the rough edge of the corner curve 110. In one embodiment of the present invention, the image 150 may correspond to a color image which is display in a delta RGB panel. These visual flaws caused by the display device 140 are supposed to be modified or diminished as much as possible to improve or to optimize the display quality of a given image.

Next, the periphery pixels of the image are locked. Locking of the periphery pixels may be enabled by targeting each one of the periphery sub-pixels of each one of the periphery pixels. For example, locking the periphery pixels may be carried out on a spatial domain. Further, targeting each one of the periphery sub-pixels of each one of the periphery pixels may refer to selective collection of the display datum of each one of the periphery sub-pixels. For example, one of the parameter in the display datum is selected or activated. Other parameters which are not selected are locked or deactivated. One feature of the present invention resides in the locking and activation of parameters in the display datum. In some embodiments, the brightness parameter is selected and activated. In some embodiments, the location parameter and the color parameter are not selected, locked to be deactivated. Deactivation of a parameter may refer to the absence of adjustment so they are locked and no change is allowed. For example, the brightness parameter 25RW, the brightness parameter 25GW and the brightness parameter 25BW of the pixel 25 are selected and activated, but the present invention is not limited thereto. For instance, the color parameter 25RC, the color parameter 25GC and the color parameter 25BC of the pixel 25 are not selected, locked to be deactivated, but the present invention is not limited thereto.

Figure 4:
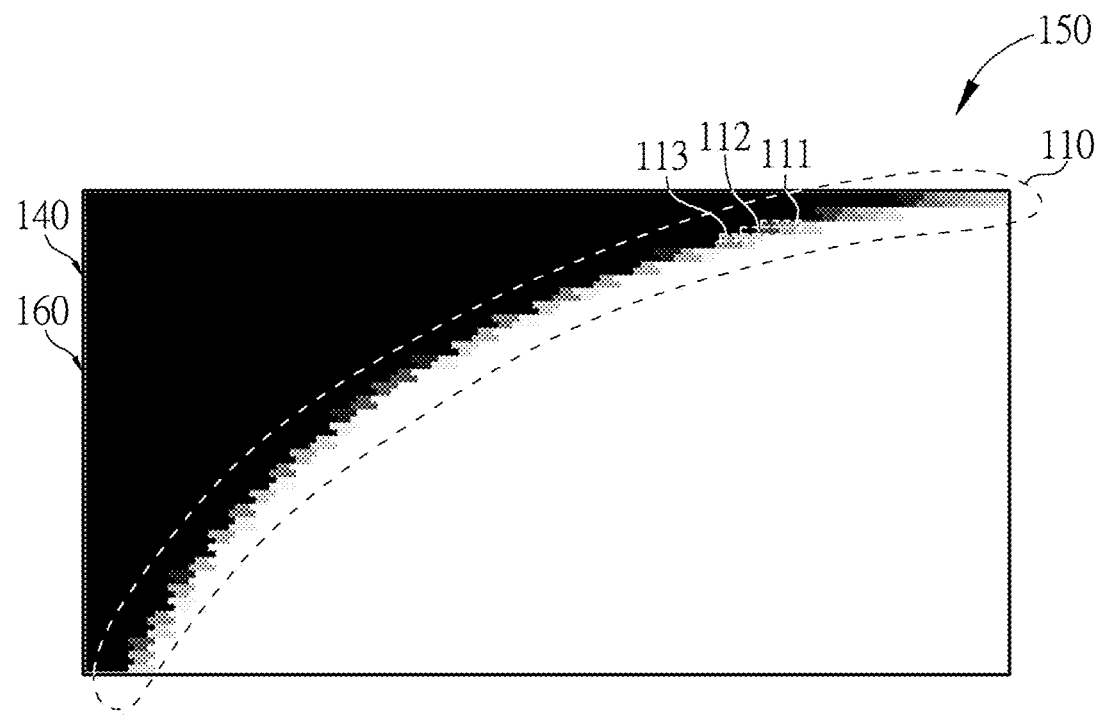
FIG. 4 illustrates that all pixels which correspond to FIG. 3 are locked on a spatial domain in accordance with the method of the present invention.
Figure 8:
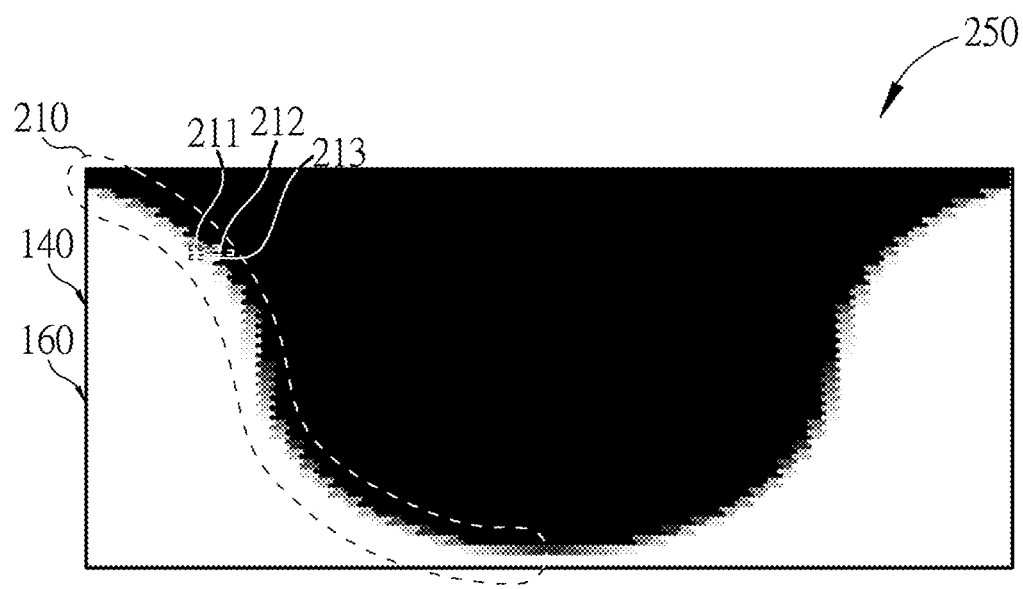
FIG. 8 illustrates that all pixel which correspond to FIG. 7 are locked on a spatial domain in accordance with the method of the present invention.
Figure 12:
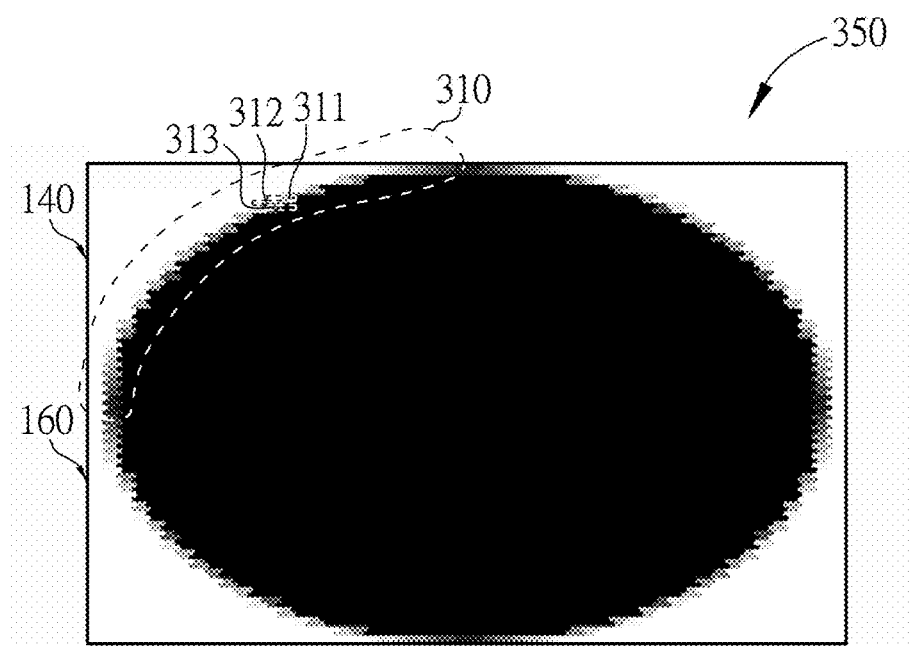
FIG. 12 illustrates that all pixels which correspond to FIG. 11 are locked on a spatial domain in accordance with the method of the present invention.

FIG. 4 illustrates that all pixels, including the pixel 111, the pixel 112 and the pixel 113 which correspond to FIG. 3 are locked on a spatial domain. FIG. 8 illustrates that all pixels, including the pixel 211, the pixel 212 and the pixel 213 which correspond to FIG. 7 are locked on a spatial domain. FIG. 12 illustrates that all pixels, including the pixel 311, the pixel 312 and the pixel 313 which correspond to FIG. 11 are locked on a spatial domain. A spatial domain may refer to the arrangement of the pixels in an image in accordance with the location parameters on a panel. It is observed that all pixels are presented in a black-gray-while scale because all the color parameters are deactivated owing to the locking operation so the image is shown in a simplified gray scale with no color information.

When a parameter in the display datum is selected, this type of the parameters of pixels is respectively collected to target the periphery sub-pixels. For example, if the brightness parameter is selected, the brightness parameters in different periphery sub-pixels are respectively collected to target the periphery sub-pixels to obtain the image shown in a gray scale with no color information. In other words, the location parameter and the color parameter are locked, deactivated and no change allowed in the subsequent operation.

Then, a smoothing operation is carried out on arrangement space to adjust the selected parameter type, for example, the brightness parameters of the periphery sub-pixels. The selected parameter type which is previously subjected to targeting is subsequently subjected to the smoothing operation. The smoothing operation may adjust the selected parameter of each one of periphery sub-pixels so as to modify one or more rough edges or one or more rough curves to exhibit better visual presentation. If a brightness parameter is selected, the selected brightness parameter may be adjusted to become an adjusted brightness parameter so that an adjusted brightness parameter may correspond to the selected brightness parameter. For example, an old brightness parameter, the brightness parameter 25RW, the brightness parameter 25GW or the brightness parameter 25BW for example, becomes a new brightness parameter, a brightness parameter 25RW', a brightness parameter 25GW' or a brightness parameter 25BW' for example, after the old brightness parameter is subjected to the smoothing operation. The selected brightness parameter may be optionally adjusted by the smoothing operation so it may be different or may remain the same. In some embodiments, the new brightness parameter such as the brightness parameter 25RW is the same as the old brightness parameter such as the brightness parameter 25RW', but the present invention is not limited thereto. In some embodiments, the new brightness parameter such as the brightness parameter 25GW' is different from the old brightness parameter the brightness parameter 25GW, but the present invention is not limited thereto. The value of the parameter after the smoothing operation may be unchanged, larger or smaller.

In one embodiment of the present invention, to smooth one or more rough edges may include modifying the color-shift of the rough edge to smooth the color-shift and to obtain a color-soft edge of better visual presentation. The color-shift of the rough edge may be softened without adjusting the color parameter of each periphery pixel because the color parameter may be locked and no change is allowed. In another embodiment of the present invention, the smoothing operation may be carried out to exclusively adjust the brightness parameters without adjusting the color parameter. This is another feature of the method of the present invention. In another embodiment of the present invention, the smoothing operation may be carried out on the spatial domain to facilitate the operation.

Various types of algorithm may be used to carry out the smoothing operation. In some embodiments, a low pass filter may be used to carry out the smoothing operation. For example, the low pass filter may include an edge-preserving smooth filter. An edge-preserving smooth filter may include various suitable filters. In some embodiments, a Gaussian smooth filter may be used. In some embodiments, a level of the brightness parameter may be respectively adjusted in accordance with a suitable algorithm to collectively adjust the brightness parameters, for example a convolution layer calculation may be used. Various types of algorithm to carry out the smoothing operation are well known in the art so the details are not elaborated.

Figure 9:
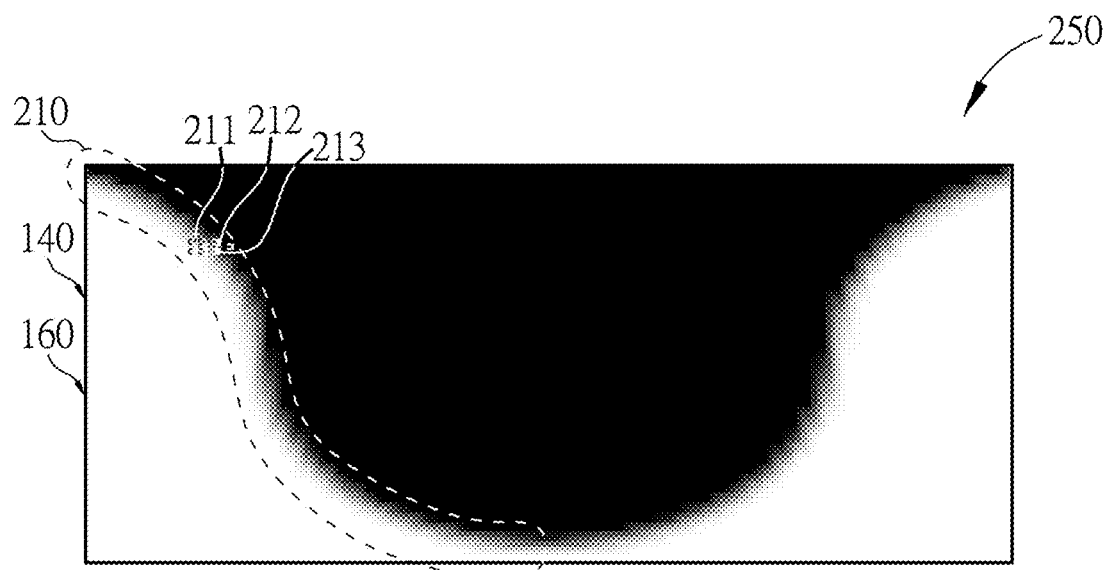
FIG. 9 illustrates the image with a smoother notch edge which corresponds to FIG. 8 on a spatial domain in accordance with the method of the present invention.
Figure 13:
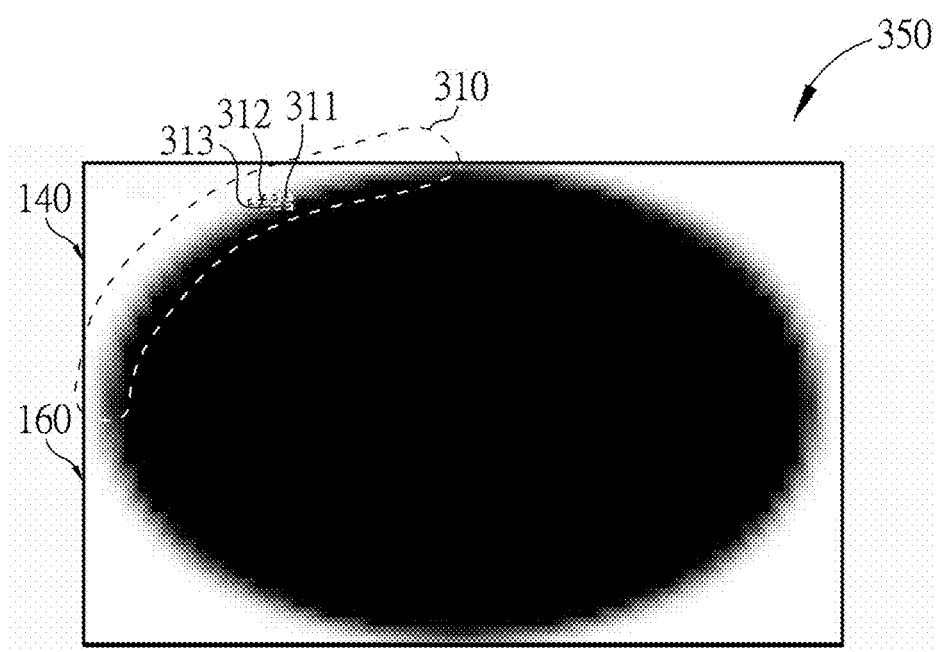
FIG. 13 illustrates the image with a smoother hole curve which corresponds to FIG. 12 on a spatial domain in accordance with the method of the present invention.

FIG. 5 illustrates the image with a smoother corner curve which corresponds to FIG. 4 on a spatial domain. FIG. 9 illustrates the image with a smoother notch edge which corresponds to FIG. 8 on a spatial domain. FIG. 13 illustrates the image with a smoother hole curve which corresponds to FIG. 12 on a spatial domain. It is observed that FIG. 5, FIG. 9 and FIG. 13 respectively show an image in a simplified gray scale with no color information because all the color parameters are locked and deactivated when the smoothing operation is carried out. Further, FIG. 5, FIG. 9 and FIG. 13 respectively show an image with a less blurry curve or a less jaggy edge to exhibit improved visual quality.

Afterwards, the periphery pixels with the adjusted brightness parameters are unlocked to obtain a resultant image, for example a smoothed image. Unlocking the periphery pixels may be carried out by inversing the display data which include the adjusted brightness parameters, such as the brightness parameter 25RW', the brightness parameter 25GW' or the brightness parameter 25BW'. Upon unlocking, all parameters of a display datum in every periphery sub-pixels of the periphery pixels are activated, for example to obtain activated and unchanged RGB values. For example, after unlocking, the color parameters of a display datum in every periphery sub-pixels of the periphery pixels are activated and remain unchanged, such as the color parameter 25RC, the color parameter 25GC and the color parameter 25BC of the periphery pixel 25. The periphery pixels with modified and/or unchanged parameters are working to collectively form a new color image which has one or more smooth edge or one or more smooth curve. The smooth edge or the smooth curve may correspond to the rough edge or the rough curve before the smoothing operation.

Figure 6:
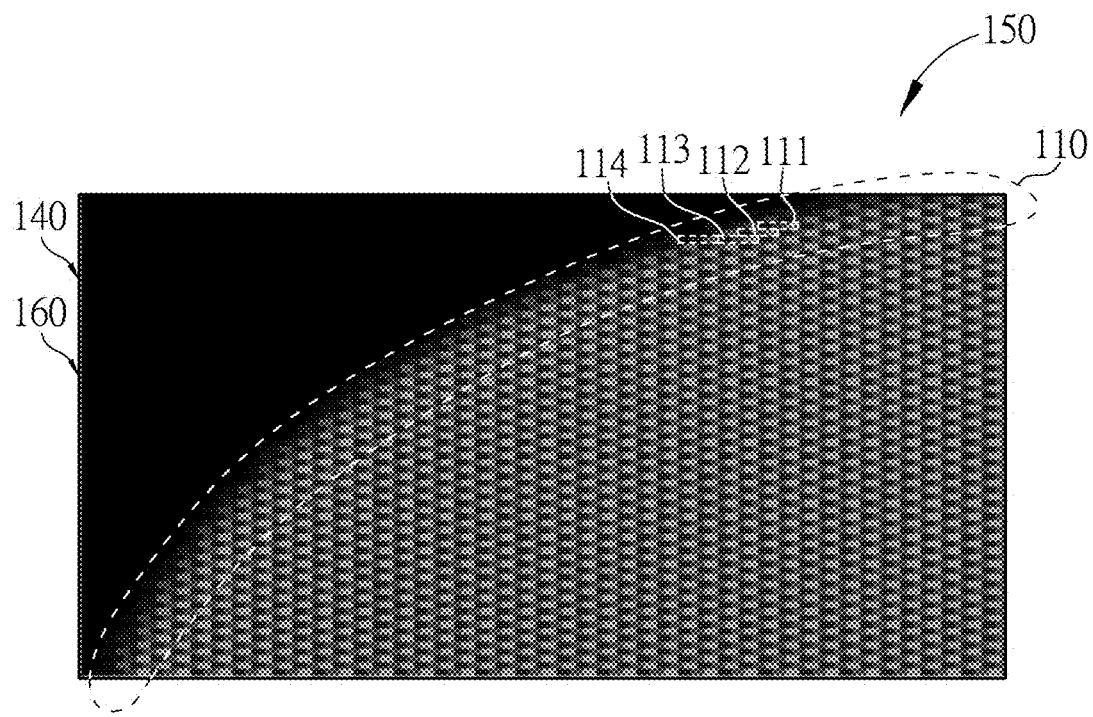
FIG. 6 illustrates the image in color with a smoother corner curve which corresponds to FIG. 7 on a spatial domain in accordance with the method of the present invention.
Figure 10:
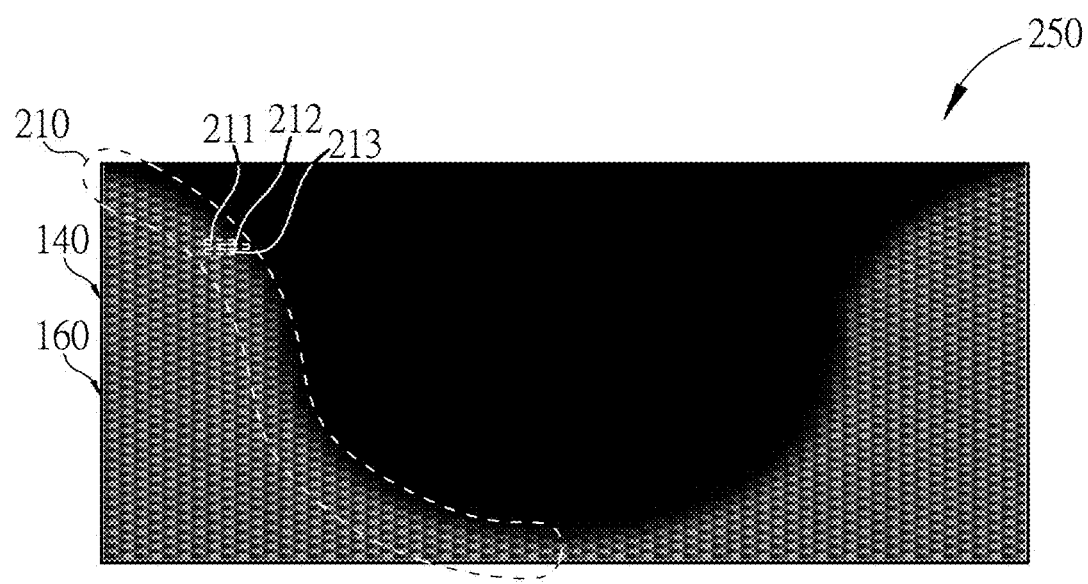
FIG. 10 illustrates the image in color with a smoother notch edge which corresponds to FIG. 9 on a spatial domain in accordance with the method of the present invention.
Figure 14:
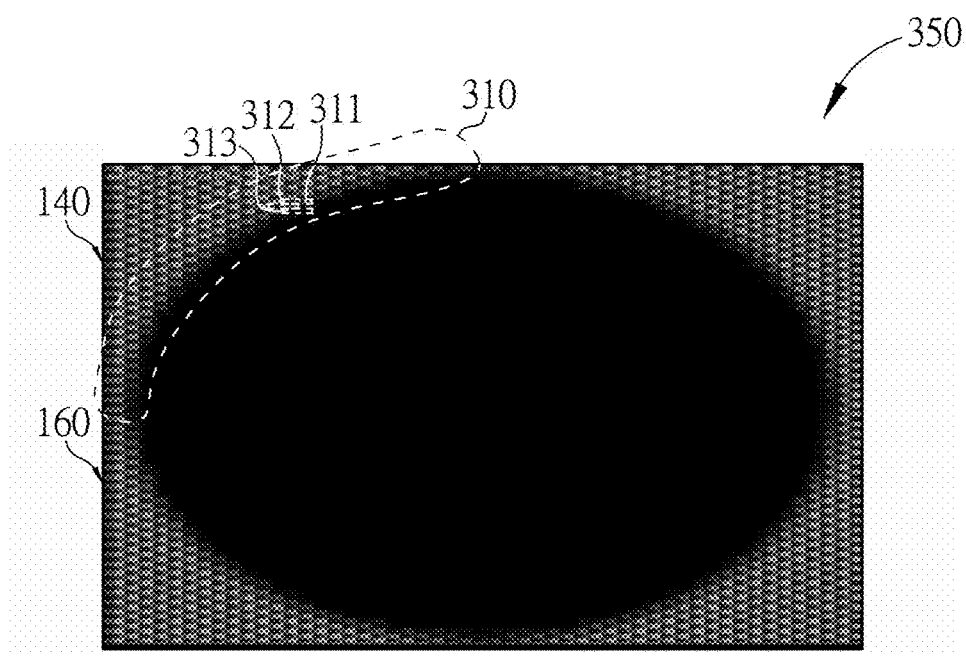
FIG. 14 illustrates the image in color with a smoother hole curve which corresponds to FIG. 13 on a spatial domain in accordance with the method of the present invention.

In one preferred embodiment of the present invention, all the curves and edges of the new image may have optimized smooth quality of better visual presentation. FIG. 6 illustrates the color image with a smoother corner curve which corresponds to FIG. 5 on a spatial domain. FIG. 10 illustrates the color image with a smoother notch edge which corresponds to FIG. 9 on a spatial domain. FIG. 14 illustrates the color image with a smoother hole curve which corresponds to FIG. 13 on a spatial domain.

In some embodiments, after the smoothing operation, the brightness of some periphery pixels or of some periphery sub-pixels may be changed because of the modification of the smoothing operation. For example, the brightness of some dark periphery pixels or of some dark periphery sub-pixels may be enhanced after the smoothing operation, but the present invention is not limited thereto. FIG. 6 illustrates that the periphery pixel 114 which includes multiple periphery sub-pixels has enhanced brightness after the smoothing operation. In other words, the dark periphery pixel 114 which includes multiple dark periphery sub-pixels, namely of weak visual perception as shown in FIG. 3, becomes an evidently visible periphery pixel 114 which includes multiple visible periphery sub-pixels with visually enhanced brightness of strong visual perception in FIG. 6 on a spatial domain because of the smoothing operation. It is possible that the smoothing operation may render a previously darker sub-pixel become a brighter sub-pixel, and vice versa. It is also possible that the color-shift of a rough edge of an image may be smoothed after the adjustment of the brightness of at least some periphery pixels or of at least some periphery sub-pixels, for example from a bright one to a dark one, or from a dark one to a bright one.

The present invention may provide a novel, simple and versatile method to improve or further to optimize the visual presentation of a color image and to modify a rough curve and/or a rough edge to correct the visual flaws of an image in a display device. In particular, the method of the present invention may advantageously correct the color-shift problem of a curve and/or an edge of a color image in the absence of the modification of all the color components of the color image. The present invention further proposes a simple change of the brightness, i.e. gray scale, of at least some periphery sub-pixels to advantageously result in the collective improvement of the color-shift of an image.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method to smooth periphery pixels of an image, comprising:

providing an image comprising a plurality of periphery pixels to be displayed on a display device, wherein each one of the periphery pixels comprises a plurality of periphery sub-pixels, each one of the periphery sub-pixels comprises a display datum and the display datum comprises a location parameter, a brightness parameter and a color parameter;

displaying the image with at least one rough edge comprising the periphery pixels, locking the periphery pixels by targeting each one of the periphery sub-pixels of each one of the periphery pixels so that the location parameter and the color parameter are locked to be deactivated, wherein the brightness parameters of the periphery sub-pixels are respectively collected to target the periphery sub-pixels;

performing a smoothing operation to adjust the brightness parameters of the periphery sub-pixels which are subjected to targeting to smooth the at least one rough edge to obtain adjusted brightness parameters which correspond to the brightness parameters and are unchanged or larger or smaller after being adjusted by the smoothing operation; and unlocking the periphery pixels with the adjusted brightness parameters to obtain the image which has at least one smooth edge so that the color parameter is activated and remains unchanged, wherein the at least one smooth edge corresponds to the at least one rough edge.

2. The method to smooth periphery pixels of an image of claim 1, wherein the image comprises a curve, and the curve corresponds to the at least one rough edge and comprises at least one of a notch edge, a corner edge and a hole edge.

3. The method to smooth periphery pixels of an image of claim 1, wherein the color parameter comprises a red color parameter, a green color parameter and a blue color parameter.

4. The method to smooth periphery pixels of an image of claim 1, wherein a computer with a display is used for displaying the image with at least one rough edge.

5. The method to smooth periphery pixels of an image of claim 1, wherein the at least one rough edge comprises at least one of a blurry edge, a jaggy edge and a color-shift edge.

6. The method to smooth periphery pixels of an image of claim 5, wherein to smooth the at least one rough edge comprises modifying the color-shift edge to obtain a color-soft edge without adjusting the color parameter.

7. The method to smooth periphery pixels of an image of claim 1, wherein the location parameter corresponds to displaying the image with the at least one rough edge.

8. The method to smooth periphery pixels of an image of claim 1, wherein locking the periphery pixels is performed on a spatial domain by locking the color parameter.

9. The method to smooth periphery pixels of an image of claim 8, wherein performing the smoothing operation is performed on the spatial domain.

10. The method to smooth periphery pixels of an image of claim 1, wherein a low pass filter is used for performing the smoothing operation.

11. The method to smooth periphery pixels of an image of claim 10, wherein the low pass filter is an edge-preserving smooth filter.

12. The method to smooth periphery pixels of an image of claim 1, wherein performing the smoothing operation exclusively adjusts the brightness parameters without adjusting the color parameter.

13. The method to smooth periphery pixels of an image of claim 1, wherein displaying the image with the at least one rough edge comprises that the periphery pixel is arranged in accordance with the location parameter.

14. The method to smooth periphery pixels of an image of claim 1, wherein the location parameter corresponds to a layout of the image.

15. The method to smooth periphery pixels of an image of claim 1, wherein unlocking the periphery pixels is performed by inversing to the display data which comprise the adjusted brightness parameters.

16. The method to smooth periphery pixels of an image of claim 1, wherein the image corresponds to a delta RGB panel.

17. The method to smooth periphery pixels of an image of claim 1, wherein a level of the brightness parameter is respectively adjusted to collectively adjust the brightness parameters.

* * * * *